United States Patent
Williams et al.

(10) Patent No.: US 8,442,033 B2
(45) Date of Patent: May 14, 2013

(54) DISTRIBUTED VOICE OVER INTERNET PROTOCOL RECORDING

(75) Inventors: Jamie Richard Williams, Alpharetta, GA (US); Scott Bluman, Atlanta, GA (US); Thomas Z. Dong, Marietta, GA (US); Christopher D. Blair, South Chailev (GB); Richard L. Heap, London (GB)

(73) Assignee: Verint Americas, Inc., Alpharetta, GA (US)

( * ) Notice: Subject to any disclaimer, the term of this patent is extended or adjusted under 35 U.S.C. 154(b) by 1516 days.

(21) Appl. No.: 11/394,408

(22) Filed: Mar. 31, 2006

(65) Prior Publication Data

US 2007/0263785 A1 Nov. 15, 2007

(51) Int. Cl.
*H04L 12/66* (2006.01)
*H04M 3/00* (2006.01)
*H04M 5/00* (2006.01)

(52) U.S. Cl.
USPC .......................................... 370/352; 379/256

(58) Field of Classification Search .................. 370/352; 379/265.06, 256
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,210,789 A | 5/1993 | Jeffus et al. | |
| 5,239,460 A | 8/1993 | LaRoche | |
| 5,241,625 A | 8/1993 | Epard et al. | |

(Continued)

FOREIGN PATENT DOCUMENTS

| | | |
|---|---|---|
| EP | 0453128 A2 | 10/1991 |
| EP | 0773687 A2 | 5/1997 |

(Continued)

OTHER PUBLICATIONS

"Customer Spotlight: Navistar International," Web pae, unverified print date of Apr. 1, 2002.

(Continued)

*Primary Examiner* — Asad Nawaz
*Assistant Examiner* — Nicholas Jensen
(74) *Attorney, Agent, or Firm* — Meunier Carlin & Curfman

(57) ABSTRACT

Included are embodiments of systems and methods for recording data related to a communication. One exemplary embodiment, among others includes receiving data related to a communication from a communications device, recording at least a portion of the data related to the communication, determining a time of reduced network activity and sending at least a portion of the data related to the communication to a central recording server at a time of low network activity.

15 Claims, 8 Drawing Sheets

U.S. PATENT DOCUMENTS

| | | | |
|---|---|---|---|
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A * | 9/2000 | Bar et al. .................. 709/224 |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | Eftink |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 * | 1/2003 | Beckett et al. ............ 379/265.06 |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,155,207 B2 | 12/2006 | Chapman et al. |
| 7,379,628 B2 | 5/2008 | Nagaya et al. |
| 7,412,531 B1 * | 8/2008 | Lango et al. ................. 709/231 |
| 7,483,379 B2 | 1/2009 | Kan et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0132432 A1 | 7/2004 | Moores et al. |
| 2004/0165717 A1 | 8/2004 | McIlwaine et al. |
| 2005/0018622 A1 | 1/2005 | Halbraich et al. |
| 2005/0135609 A1 | 6/2005 | Lee et al. |
| 2008/0005318 A1 | 1/2008 | Dong et al. |

FOREIGN PATENT DOCUMENTS

| EP | 0989720 | 3/2000 |
|---|---|---|
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.
"OnTrack Online Delivers New Web Functionality," Web page, unverified print date of Apr. 2, 2002, unverified cover date of Oct. 5, 1999.
"PriceWaterouseCoopers Case Study The Business Challenge," Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 ( © 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs,"* *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.

Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, Sci-Tech, Dec. 4, 1997.
*Interactive TV Overview TimeLine*, Interactive TV News.
*Interactive TV Wars Heat Up*, Industry Standard.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.

* cited by examiner

US 8,442,033 B2

DISTRIBUTED VOICE OVER INTERNET PROTOCOL RECORDING

BACKGROUND

The need for recording of telephony and screen data of agent calls to allow for quality assessment, improvement, and/or dispute resolution is a common problem within the communications industry. One solution for many communications needs includes the introduction of Voice over Internet Protocol (VoIP) as an alternative to traditional Time Division Multiplexing of audio. One of the advantages of VoIP is that customers can support branch networks of many small branches with very limited telephony hardware at each site. Often a fallback capability to VoIP includes allowing emergency and other calls to be made in the event of failure of the connection between that branch and the rest of the network.

In highly distributed branch networks, telephony connections can be centralized via a small number of "hub" sites or can be distributed to many or all of the "leaf" nodes of the network. The latter approach is commonly used for high street or retail operations where each location has a few telephone circuits from its local central office terminating on equipment at that site. There is therefore an increasing need to provide recording systems in communications networks that are well suited to all the supported topologies. The challenge in recording communications in telephone networks that are distributed across multiple branches is that much of the telephone traffic carried is entirely local to that branch. The audio packets associated with the communication do not generally leave the branch. Additionally, it is generally not desirable for the audio packets to leave the branch because there is often only limited bandwidth between the branch and corporate headquarters/data center.

Many existing IP recording solutions can require a recording device to be located at each branch so as to tap into the audio at that branch. Where the number of branches is large, this becomes very expensive. When the total number of calls to be recorded is low, such a network configuration can become uneconomic, as the costs of the hardware and related support are spread across only a few recordings per day.

Additionally, using existing IP conferencing/service-observe type solutions in which conference bridges are located at the central site generally requires that the audio data be "tromboned" from the receiving site to the conference bridge and back again. In this approach, two legs of a 3-way conference (caller, agent, and recorder port) will generally be transmitted between the branch site and the central equipment. In addition to using scarce bandwidth over this link, such a configuration can use expensive resources at the central site and can impact the quality of the communication.

Thus, a heretofore unaddressed need exists in the industry to address the aforementioned deficiencies and inadequacies.

SUMMARY

Included are embodiments of a system for distributive recording of a communication. At least one embodiment includes a central recording system configured to receive and store data related to a communication and a computing device configured to record data related to a communication. Embodiments of the computing device are further configured to send at least a portion of data related to the communication to the central recording system. Embodiments of the computing device include a screen capture daemon configured to facilitate capture of visual data related to the communication, a capture control daemon configured to assemble data into audio streams, and a voice capture daemon configured to facilitate capture of audio data related to the communication. Embodiments of the system also include a capture controlling device, the capture controlling device being coupled to the computing device, the capture controlling device being configured to provide at least one packet assembly command to the capture control daemon. Embodiments of the system also include an application server coupled to the computing device, the application server being configured to send at least one action command to the capture controlling device.

Also included are embodiments of a method for distributive recording of data related to a communication. One embodiment includes receiving data related to a communication, recording at least a portion of the data related to the communication, determining a time of reduced network activity, and sending at least a portion of the data related to the communication to a central recording server at a time of low network activity.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The present disclosure makes references to a communications network with multiple outlets. Customers generally desire a selective quality system to record data associated with their in-store agents. The agents can use a heavily distributed Intelligent Contact Management (ICM) IP telephony switch, with stations spread over several of a multitude of sites. This disclosure also outlines a plug compatible replacement for the voice capture component that can allow an application server to work in an ICM environment.

ICM generally lacks a Service Observation capability, so an alternate voice capture capability is generally desired. In such a topology, port spanning is also generally not available. Because of the lack of a service observation capability, passive-tap recording at each site could be implemented, however such a solution can be very costly. The service observation capability can also be simulated by an on-demand targeted capture of a single IP telephone station. The result can be delivered as one or more audio files (such as wav files) to a server such as an application server.

In many telecommunications environments, a computer is associated with many of the telephones at a branch office. The computer hardware can be separate from the telephone hardware, however this is not a requirement. More specifically, in an exemplary embodiment, the computer can include telecommunications capabilities and act as a telephone without additional hardware. Other configurations can include telecommunications hardware that is distinct from the computing device 104. In such a configuration, the computer and telephone hardware may be communicatively coupled, however this is not a requirement. Regardless of the configuration, there is generally a computing device (or computing logic) associated with a telephone (or telecommunications logic) in many communications networks. Indeed, in an increasing number of scenarios, the "telephone" includes a software application residing on a computing device (a "softphone") rather than a physical device in its own right.

In many cases, the computing device being used proximate to a Voice over Internet Protocol (VoIP) telephone is already, or can be connected to receive audio packets sent to and from the telephone. The computing device can therefore be used to record audio data from that telephone. Additionally, other data output from the computing device 104 can also be recorded. By installing a recording application on the computing device 104 alongside the VoIP phone, recordings can be made from that phone. The recordings can then be transmitted to a central site immediately or buffered locally and sent when there is bandwidth to spare.

Figure 1:
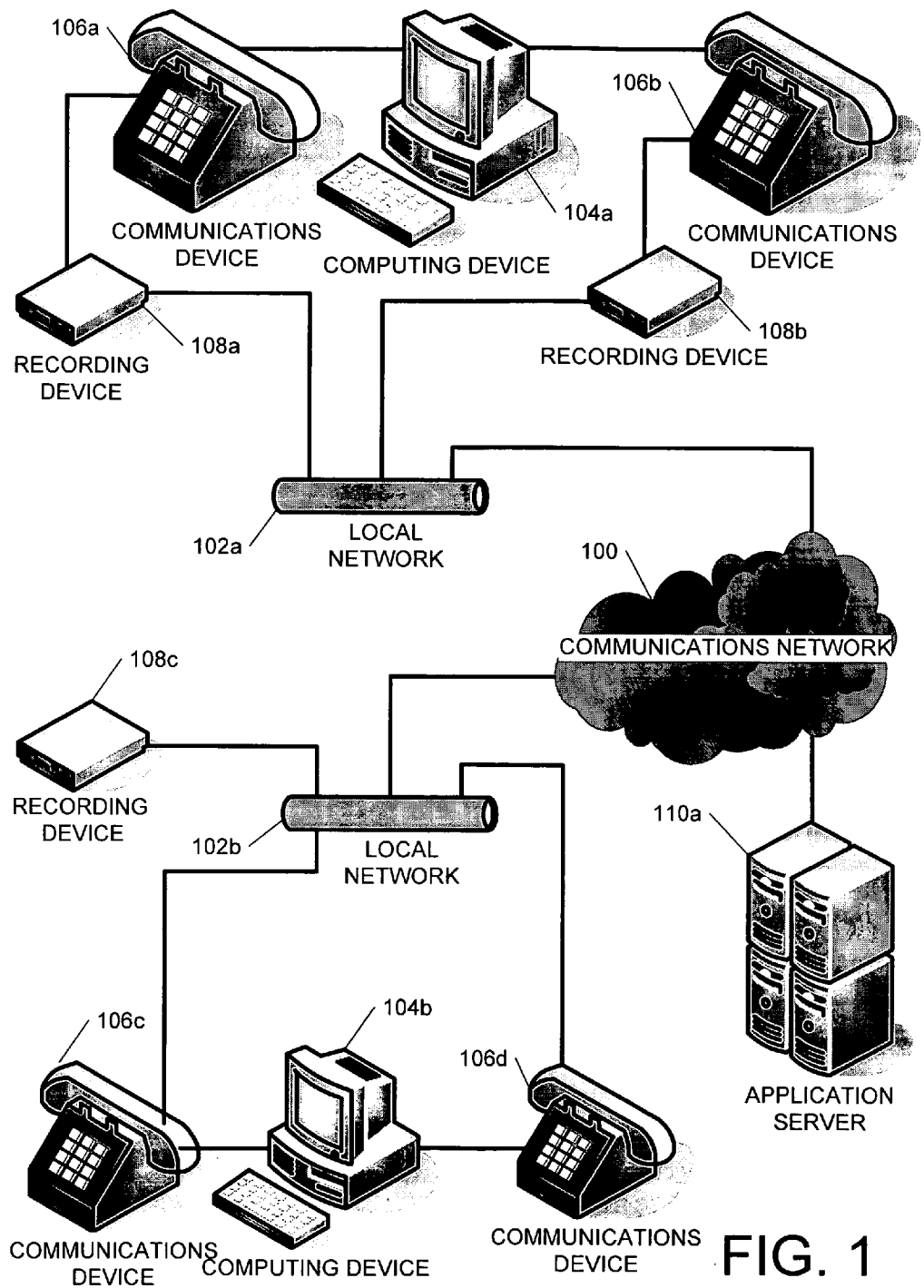
FIG. 1 is a functional diagram illustrating an exemplary configuration of a communications network.

FIG. 1 is a functional diagram illustrating an exemplary configuration of a communications network. In this exemplary embodiment, communications devices 106a and 106b are coupled to computing device 104a. Additionally, communications device 106a is coupled to local network 102a via recording device 108a. Similarly, communications device 106b is coupled to local network 102a via recording device 108b. Local network 102a is coupled to communications network 100.

Similarly, communications device 106c, as well as communications device 106d, are coupled to computing device 104b. Communications device 106c is also coupled to local network 102b via recording device 108c. Communications device 106d is coupled to local network 102 via recording device 108d. Local network 102b is coupled to communications network 100. Additionally coupled to communications network 100 is an application server 110a. As discussed above, the application server 110a can perform any of a plurality of operations. Additionally, while application server 110a is illustrated as being coupled to communications network 100, one or more application servers 216a can be configured to service specific portions of the overall network illustrated in FIG. 1. More specifically, one can conceive an application server coupled to local network 102a, as well as an application server coupled to local 210b. Other configurations can also be considered as part of this disclosure.

As discussed above, in many communications environments, a computing device is coupled, either directly or indirectly, to at least one communications device. While the exemplary embodiment of FIG. 1 illustrates two communications devices (106a and 106b) being coupled to one computing device 104a, this is a nonlimiting example, as other configurations can include one or more communications devices coupled to one or more computing devices. Similarly, while the computing devices 206 are illustrated as being separate from communications devices 106, this is a nonlimiting example. As one of ordinary skill in the art will understand, computing logic can be implemented in a communications device 106. Other configurations can include communications logic in the computing devices 206. Other configurations are also contemplated.

As illustrated in FIG. 1, recording devices 108a and 108b are coupled to communications devices 106a and 106b, respectively. Recording device 108c is coupled to local network 102b. In either configuration one or more recording device is implemented at each branch that is coupled to communications network 100. As discussed above, increased expense and network complexity can result from such a configuration.

One should also note that local networks 102a, 102b, 102c, and 102d (referred to collectively as local network 102) can include any of a plurality of different networks. More specifically one or more network or network types can be implemented, including but not limited to a Local Area Network (LAN). Similarly, communications network 100 can include one or more different networks and/or types of networks. As a nonlimiting, example, communications network 100 can include a Wide Area Network (WAN), the Internet, and/or other network.

Figure 2:
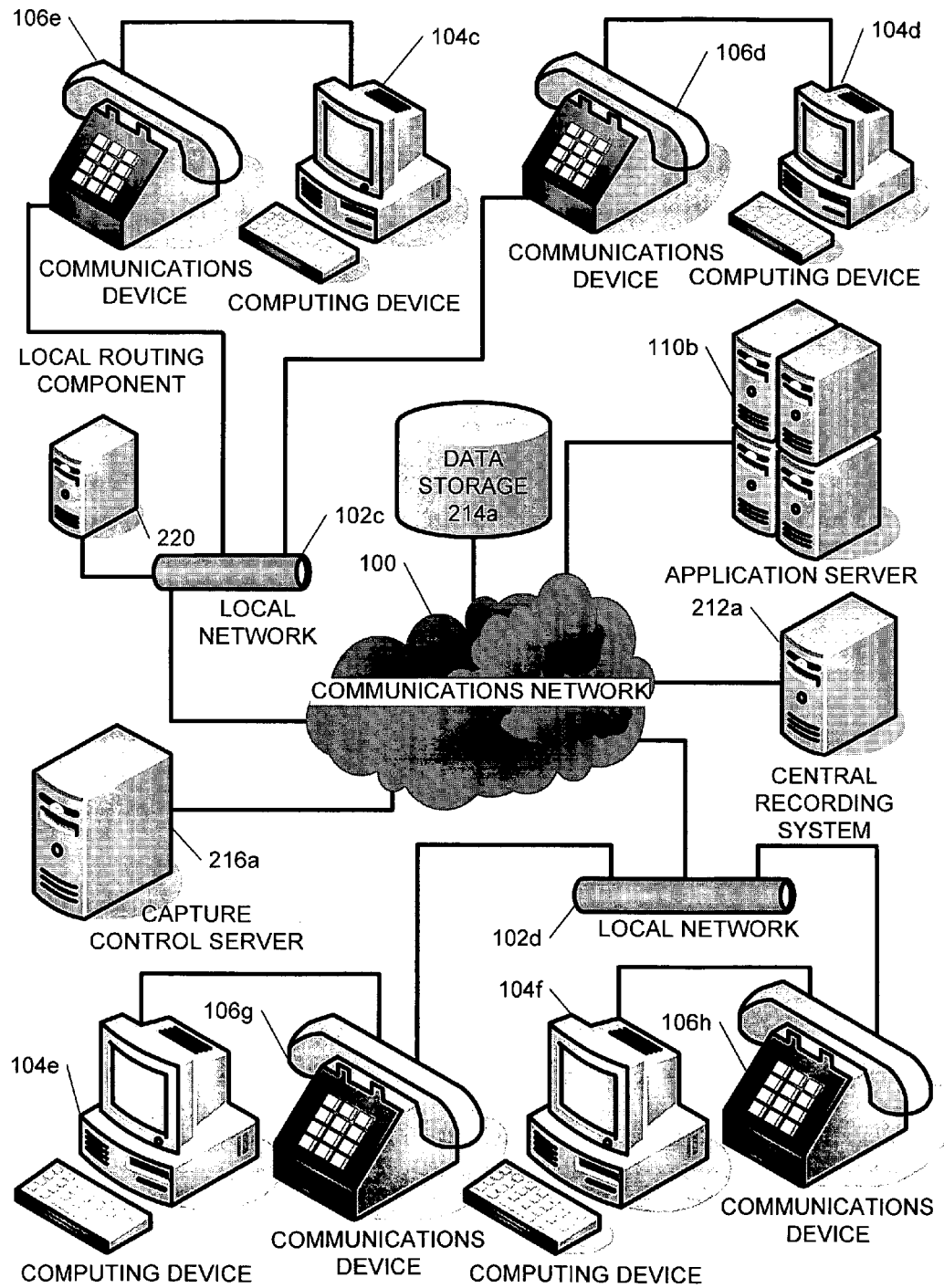
FIG. 2 is a functional diagram illustrating another exemplary configuration of a communications network with remotely located servers for overcoming deficiencies of the configuration from FIG. 1.

FIG. 2 is a functional diagram illustrating another exemplary configuration of a communications network with remotely located servers for overcoming deficiencies of the configuration from FIG. 1. In this exemplary embodiment, communications device 106e is coupled to computing device 104c, as well as to local network 102c. Similarly, communications device 106f is coupled to computing device 104d, as well as local network 102c. Similarly, communications device 106g is coupled to computing device 104e, as well as local network 102d. Communications device 106h is coupled to computing device 104f, as well as local network 102d.

Local network 102d is coupled to communications network 100. Similarly, local network 102c is coupled to communications network 100. Also coupled to communications network 100 are application server 110b, capture control server 216a, and data storage 304. One should note that while data storage 214a, application server 110b, central recording system 212a, and capture control server 216a are coupled to communications network 100, these devices (or logic) can physically be located together at a remote site, or separately at a plurality of remote sites, regardless of the physical location of this logic, the functionality associated with these components can be configured to serve one or more branch that is coupled to communications network 100. Additionally, while data storage 214a, application server 110b, central recording system 212a, and capture control server 216a are depicted as separate devices, this is also a nonlimiting example. In at least one embodiment one or more of these may be combined. Similarly, the functionality of these devices may also be embodied through software, firmware, or hardware, depending on the configuration. As such illustration of this functionality as devices is a nonlimiting example.

Additionally included in the nonlimiting example of FIG. 2 is a local routing component 220. Local routing component 220 can be configured to facilitate communications from communications device 106c and 106d when communications network 100 is unavailable. More specifically, if a connection between the communications network 100 and local network 102c is severed, the local routing component (which can operate using Survivable Remote Site Telephone (SRST) and/or other technologies) can be configured to facilitate communication of the communications data to the recorder and/or storage of the communications data. Such a configuration can facilitate a local protocol based recording, which can be implemented for a primary recording mechanism and/or to provide fail-over recording protection.

Figure 3:
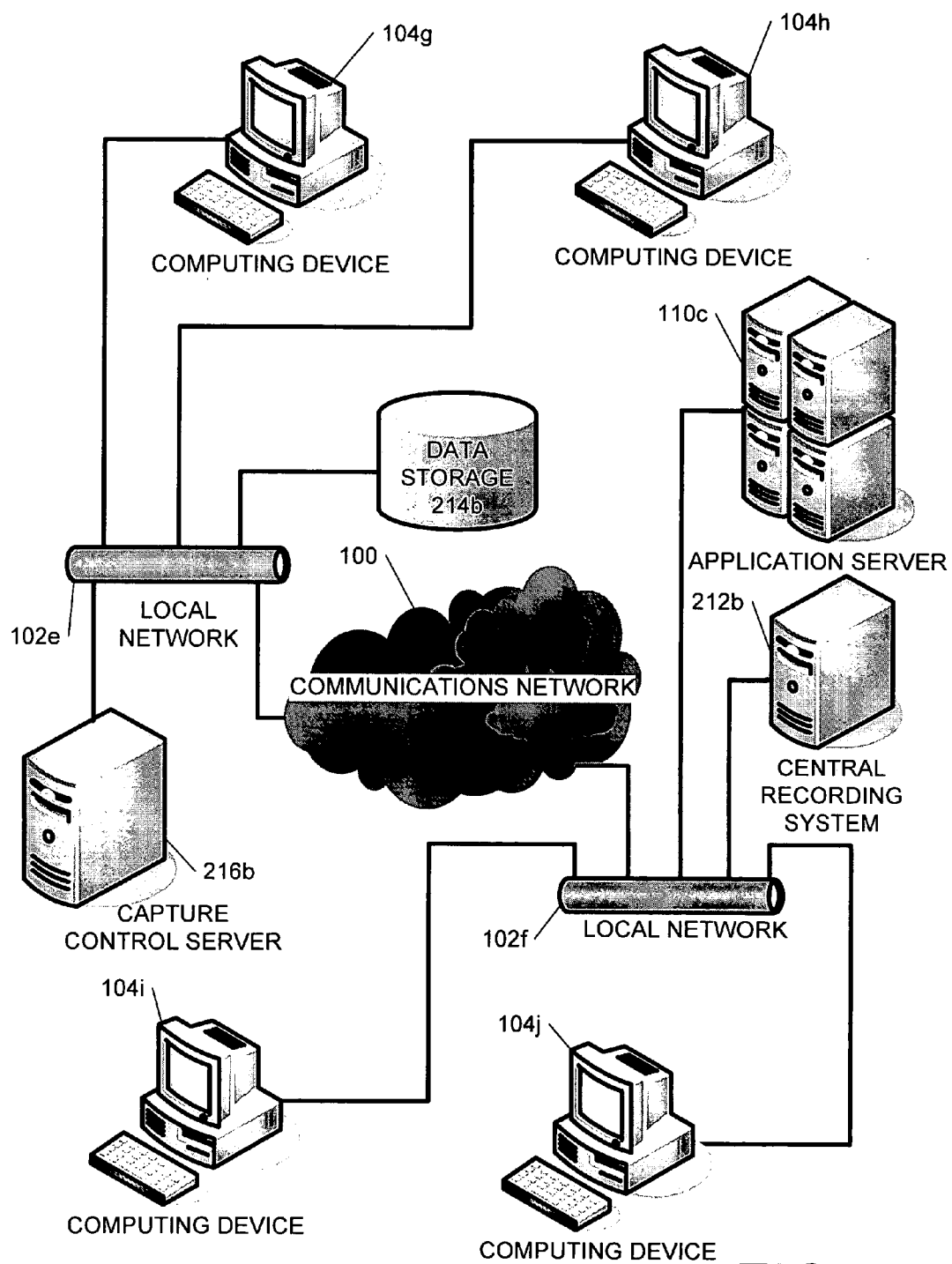
FIG. 3 is a functional diagram illustrating an exemplary communications network with locally located servers, similar to the configuration from FIG. 2.

FIG. 3 is a functional diagram illustrating an exemplary communications network with locally located servers, similar to the configuration from FIG. 2. More specifically, as illustrated in the nonlimiting example of FIG. 3, computing device 104g, which includes a softphone and therefore has the functionality of both a computing device and a communications device, is coupled to local network 102e. Also coupled to computing device 104h, which is also equipped with a softphone. Softphone enabled computing device 104i is coupled to local network 102f, as well as softphone enabled computing device 104j. Local networks 102e and 102f are coupled to communications network 100.

Also coupled to local network 102e is data storage 214b, as well as capture control server 216b. Coupled to local network 102f is central recording system 212b and application server 110c. More specifically, FIG. 3 illustrates that the functionality embodied in data storage 214b, capture control server 216b, application server 110c, and central recording system 212b can be coupled to the communications network 100 via a local network. These devices need not be remotely situated from any branch office and may be physically located at the same or different locations.

Figure 4:
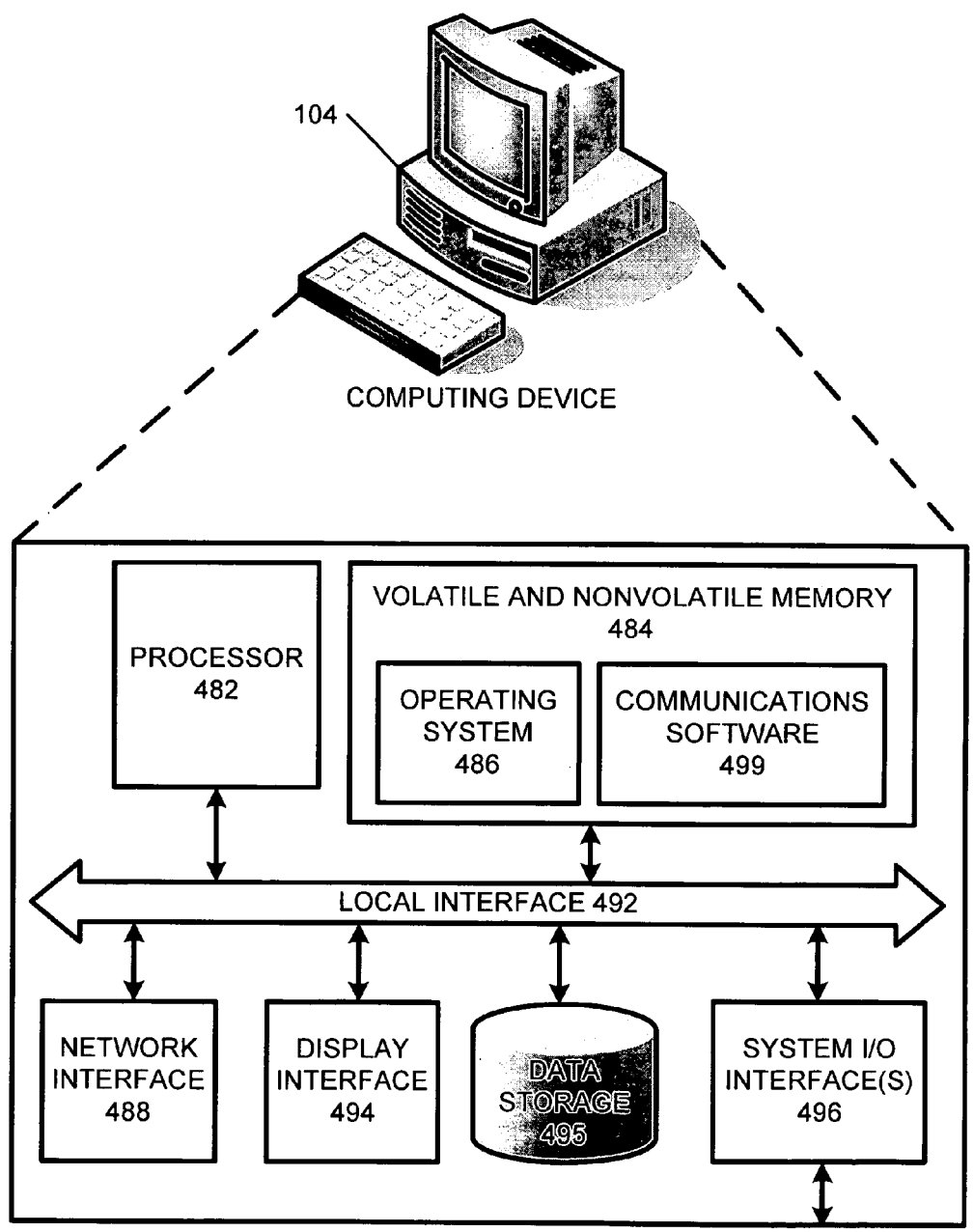
FIG. 4 is a schematic diagram illustrating an exemplary embodiment of a computing device that may be configured to communicate via a communications network such as the networks from FIGS. 1, 2, and 3.

FIG. 4 is a schematic diagram illustrating an exemplary embodiment of a computing device that may be configured to communicate via a communications network such as the networks from FIGS. 1, 2, and 3. Although a wire-line communications device is illustrated, this discussion can be applied to any device. As illustrated in FIG. 4, in terms of hardware architecture, the computing device 104 includes a processor 482, volatile and nonvolatile memory 484, a display interface 494, data storage 495, and one or more input and/or output (I/O) device interface(s) 496 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a hardware device for executing software, particularly software stored in volatile and nonvolatile memory 484.

The processor 482 can be any custom made or commercially available processor, a central processing unit (CPU), an auxiliary processor among several processors associated with the computing device 104, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 484 can include any one or combination of volatile memory elements (e.g., random access memory (RAM, such as DRAM, SRAM, SDRAM, etc.)) and nonvolatile memory elements (e.g., ROM, hard drive, tape, CD-ROM, etc.). Moreover, the memory 484 may incorporate electronic, magnetic, optical, and/or other types of storage media. Note that the volatile and nonvolatile memory 484 can have a distributed architecture, where various components are situated remote from one another, but can be accessed by the processor 482.

The software in volatile and nonvolatile memory 484 may include one or more separate programs, each of which includes an ordered listing of executable instructions for implementing logical functions. In the example of FIG. 4, the software in the volatile and nonvolatile memory 484 may include communications client software 499, as well as an operating system 486. Communications client software 499 can include a screen capture daemon, a capture control daemon, a voice capture daemon, recording logic, voice recognition logic, as well as other logic. Additionally, while communications client software is illustrated in this nonlimiting example as a single piece of logic, as one of ordinary skill in the art will understand, communications logic 499 can include one or more separate software, hardware, or firmware modules.

A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 486 essentially controls the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 484, so as to operate properly in connection with the Operating System 486.

The Input/Output devices that may be coupled to system I/O Interface(s) 496 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc. Similarly, network interface 488, which is coupled to local interface 492 can be configured to communication with a communications network, such as the network from FIGS. 2 and 3. While this communication may be facilitated via a communications device, such as communications device 106, this is not a requirement.

If the computing device 104 is a personal computer, workstation, or the like, the software in the volatile and nonvolatile memory 484 may further include a basic input output system (BIOS) (omitted for simplicity). The BIOS is a set of software routines that initialize and test hardware at startup, start the Operating System 486, and support the transfer of data among the hardware devices. The BIOS is stored in ROM so that the BIOS can be executed when the computing device 104 is activated.

When the computing device 104 is in operation, the processor 482 can be configured to execute software stored within the volatile and nonvolatile memory 484, to communicate data to and from the volatile and nonvolatile memory 484, and to generally control operations of the computing device 104 pursuant to the software. Software in memory, in whole or in part, is read by the processor 482, perhaps buffered within the processor 482, and then executed. Additionally, one should note that while the above description is directed to a computing device 104, other devices (such as application server 110, capture control server 216a, and central recording system 212a) can also include the components described in FIG. 4.

One should note that communications device 106 can be configured with one or more of the components and/or logic described above with respect to computing device 104. Additionally, communications device and/or computing device can include voice recognition logic, voice-to-text logic, text-to-voice logic, etc. (or any permutation thereof), as well as other components and/or logic for facilitating a communication. Additionally, in some exemplary embodiments, the communications device 106 can include the computing functionality described with respect to computing device 104. Similarly, in some exemplary embodiments, the computing device 104 can include the communications functionality described with respect to communications device 106. While reference to various components and/or logic is directed to the computing device 104 or the communications device 106, as one of ordinary skill in the art will understand, these are nonlimiting examples, as such functionality can be implemented on the computing device 104, the communications device 106, or both.

In operation, embodiments of the computing device 104 include a screen capture daemon. Screen capture of various data related to a communication can be implemented such that the application server 110b will contact the screen capture daemon and obtain screen frames associated with a communication. Similarly, for voice capture, many communications devices, such as IP telephones generally include a small switching hub and can be wired in between the local network infrastructure 102 and the computing device 104 proximate the communications device 106. Physically, the communications device 106 can include two RJ-45 connections. One connection is connected via the building cabling back to the local network 102. The computing device 104 can be connected to the other connection via a short hook-up cable.

In at least one nonlimiting example, the computing device 104 and communications device 106 are configured to act as independent devices, but, because the hub/switch can be physically located inside the communications device 106, the communications device 106 can be configured to control the packet flow and copy the associated Real Time Protocol (RTP) streams, so that the desired data can be seen on the computing device's network interface. As RTP streams are addressed to the communications device 106 (or the communications device's counterparty) the RTP streams can be ignored at the hardware level in the network interface 488. However, if the network interface 488 is configured to receive data in a promiscuous mode, the network interface 488 can be configured to "snoop" the RTP streams flowing to and from an adjacent communications device 106.

Voice capture can make use of this feature. A voice capture daemon (similar to the screen capture daemon) can run on computing device 104 and, under control of the application server 110, start and stop RTP packet capture. The voice capture daemon can detect and isolate the two RTP streams; one directed towards the communications device 106 and one directed away from the communications device 106. Where the call is handled locally, the audio data can be encoded in G.711 protocol, but other protocols can also be utilized, such as, but not limited to the more heavily compressed G.729A protocol (often used when calls traverse communications network 100).

Referring to capture control, the application server 110 is configured to communicate with a capture control process over a TCP/IP connection. The capture control process (which can run on the application server 110 or a capture control server 216a) announces itself to the application server 110, which can then request a desired number of record and replay ports according to settings in a data file associated with the application server 110. Even though in some embodiments there is generally no concept of "record" ports, the capture control process can accept requests for an arbitrary number of record ports and the application server 110 can reply with the number of replay ports requested. If telephone replay is supported, the capture control process can then attempt to instantiate that number of communications devices 106 for replay.

The action commands that flow from the application server 110 to the capture control process can include Service Observe ON/OFF commands that specify the station, and Capture ON/OFF commands that specify a filename exposed by the application server 110. Similarly, other commands for dialing and playing back recordings can be sent from application server 110 to the capture control process.

On receipt of a service observe command, the capture control process can look up the IP address of the desired computing device 104 from a station number supplied in a lookup table that is already being maintained for screen capture. The capture control process can then arm the voice capture daemon on the computing device 104. When the capture control process receives a capture control command, the capture control process can instruct the capture control daemon to begin assembling RTP packets into audio streams.

While any encoding protocol can be used, if an RTP codec is in use under G.729A protocol, the capture control daemon can assemble 2 kilobits of audio data each second, after the capture control daemon has removed the RTP headers. The capture control daemon can repair the RTP stream in real time by removing duplicate packets, reversing out of order packets and filling any gaps with G.729A "silence." The capture control daemon can assemble a stereo pair of files; one file for transmit, and one file for receive.

If the audio is received in a G.711 protocol, the data can optionally be compressed locally at the computing device 104 to conform with the G.726 protocol and mixed into a single stream so as to reduce its bandwidth from 2-by-64 kilobits per second (kbps) to 16 kbps. In general, any audio input format can be supported with a user-configurable determination of the format for conversion to and whether or not the data should be mixed into a single stream or kept as two independent streams. One should note that while the above description refers to G.729A protocol, G.711 protocol, and G.726 protocol, any encoding protocol can be used.

One should also note that any of a plurality of different encryption techniques may also be used. As a nonlimiting example, communications between the recorder and the daemons associated with a communications device 106 can be configured to for encryption and decryption to provide a more secure network environment.

The capture control daemon can transfer the captured audio to the capture control process, for further processing. The RTP streams captured by the capture control daemon can be disjoint. Additionally, the application server 110 can operate in a "timed" mode and ask for capture when no call is in progress. At other times, the application server 110 can put calls on hold. The capture control daemon can use a 250 millisecond (ms), or other gap in RTP to indicate breaks between calls. Each of these call segments can be given an incrementing segment number.

Uploading can be accomplished in any of a plurality of ways. As a nonlimiting example, uploading can occur during a call segment, at the end of a call segment, at the end of recording, etc. (or any permutation). The first option of near-real-time optimizes the network traffic (by sending blocks of audio, stripped of the onerous RTP headers, over elastic, reliable TCP/IP pipes) without requiring the capture control daemon to maintain temporary files on the hard disk of the computing device 104. The capture control daemon can use Hypertext Transfer Protocol (HTTP), Server Message Block (SMB), a proprietary Transmission Control Protocol/Internet Protocol (TCP/IP) based protocol, or other protocol (or any permutation therein) to complete the transfer. The choice of protocol can depend on the choice of upload timing.

After receiving a complete stereo pair, the capture control process can copy a complete stereo pair to the portion of file share exposed by the application server 110. Before the capture control process can process the complete stereo pair, the capture control process converts the audio to a single mono audio file (such as a wav file or other audio file). The capture control process can then convert this data by decompressing the two halves from the G.729A (or other) protocol to a linear format, summing the two halves, and then converting the mixed signal back to the G.711 mu-law protocol (or G.711 A-law, or other protocol, depending on the particular configuration). This operation can be CPU intensive, so some embodiments include facilitating at least one daemon to process this data in a distributed fashion. Such an implementation could, however, lead to a four-fold increase in the amount of audio data copied from the daemon to the central server(s). In the more common case, however, where the audio is received in the G.711 mu-law protocol, the local workstation can mix and compress the data before transmission, thereby allowing the central server scale to much higher capacities. Additionally, the capture control process can run co-resident with the application server 110, but when collecting data predominantly in the G.729A protocol, the decompression and mixing load that can be imposed on the capture control process mean that the capture control process can run on a separate server in many environments.

Instead of transmitting audio during the call, the recording can be buffered in volatile and nonvolatile memory 484 of the computing device 104 (on data storage 495, or otherwise stored and accessible to the computing device 104). Additionally, transmission of the recorded audio and/or screen content from computing device 104 back a central recording system can then be scheduled to occur at quiet periods (e.g., overnight or other times of reduced network traffic). Additional processing may be completed by the computing device 104 prior to or after transmission of the audio and results sent back to the recording system. When used for speech recognition, the computing device 104 may tune its speech analysis algorithms to those speakers from whom the computing device 104 normally received voice data.

Additionally, for increased efficiency of data transfer, the audio and screen data may be combined over a single connection. Since screen data and audio data can both be recorded at the computing device 104, the system clock associated with the computing device 104 can be used to timestamp audio packets and on-screen changes such that the precise relationship between these is known.

Other embodiments can include commands to start and stop screen and audio recording being combined giving more efficient, simpler and more synchronized control over the recording. Similarly, the deployment of screen and audio recording components on the computing device 104 can be combined into a single installation package such that deploying the audio recording component provides negligible additional overhead if screen capture is being deployed. If audio is buffered at the workstation, 100% recording can be turned on at the computing device 104 with minimal realized impact on the bandwidth or load on the rest of the overall network.

The central processing system 320 can then instruct the computing device 104 to delete or forward each recording at a later time. This option allows the system to make decisions based on factors that could not be known at the start of the call, such as call duration and call outcome. Although described herein as operating under the control of a centralized quality management system with connection to a central Computer Telephony Integration (CTI) feed, the system can also be deployed with local call detection. By interpreting call setup and control information passing to and from the communications device 106, a computing device 104 can apply local rules or record some or all calls and annotate these recordings with details gleaned from the communications device 106 (e.g., ANI, agent ID as well as others). These details can then be passed back to the central recording system along with the audio content.

For added security of recordings, in at least one exemplary embodiment, computing devices 206 may copy recording content to other computing devices 206 so as to provide fallback storage in the event of failure of the computing device 104 or its hard disk or attempts to tamper with the recordings.

To detect tampering and failure of the recording components, embodiments of the central recording system 212 may "heartbeat" the software on one or more computing device 104 on a regular basis to confirm that a particular computing device 104 is still operational and has not failed or been disabled. To ensure that unauthorized parties do not take control of the computing device 104 by "spoofing" the quality system, the computing device 104 may be configured with security devices such as a public key encoding system (not shown) so that only the authorized server can communicate with the computing device 104. The computing device 104 may also alert the user should the IP address of the quality server controlling the computing device 104 change. This alert can give the user an option to accept or reject this new connection.

In at least one exemplary embodiment computing devices 104 can be configured to transmit recordings to multiple destinations if requested and/or central equipment can be configured to copy from one system to another if bandwidth between the central hubs is more readily available than between remote sites and hubs.

Figure 5:
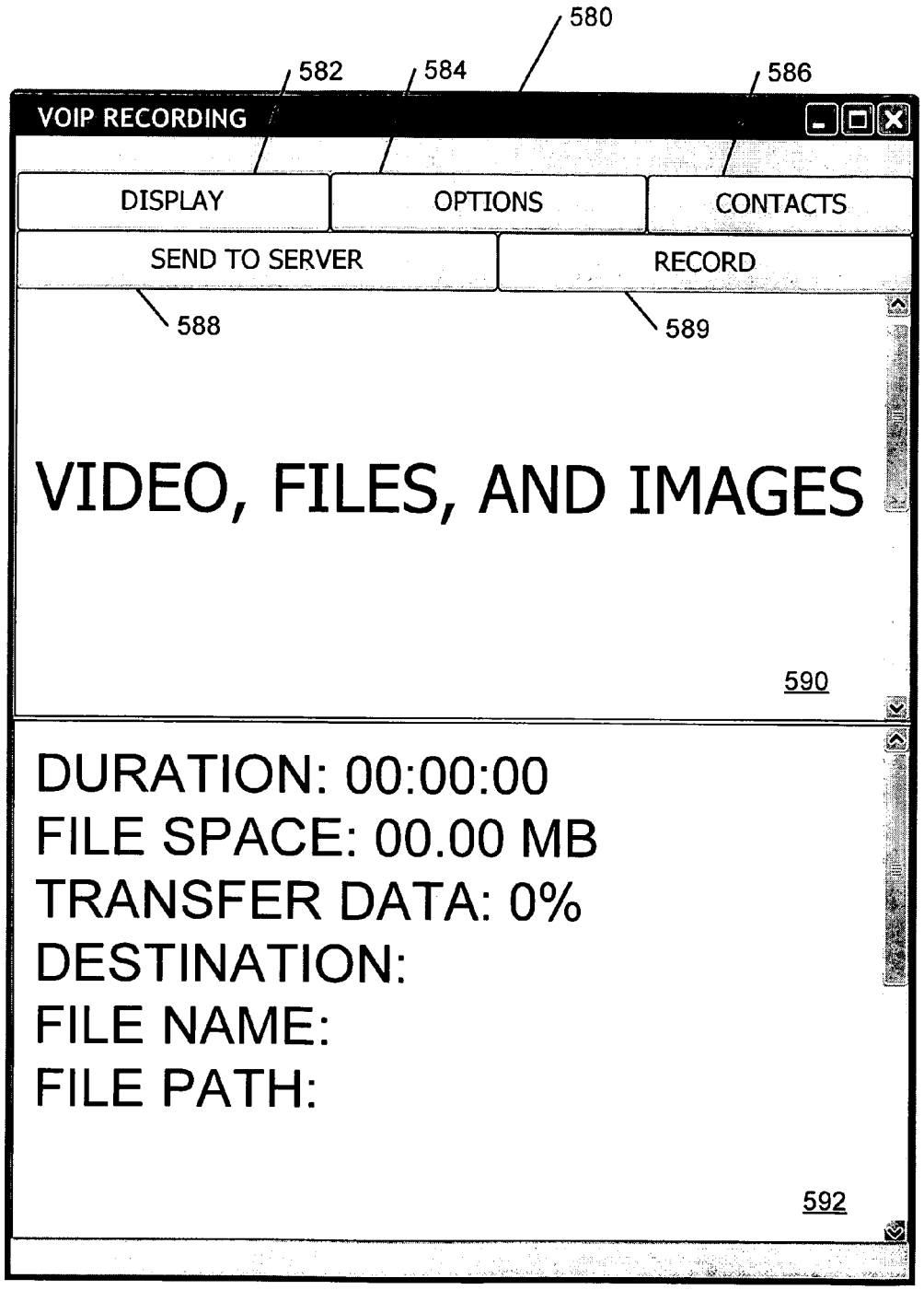
FIG. 5 is an exemplary user interface, which may be implemented in the computing device of FIG. 4.

FIG. 5 is an exemplary user interface, which may be implemented in the computing device of FIG. 4. More specifically, the VoIP recording interface 580 can include a display option 582, an options option 584, a contacts option 586, a send to server option 588, and a record option 589. The display option 582 can provide a user one or more options to configure the display of VoIP recording interface 580. Options can include fonts, size, layout, shapes, colors, etc. Similarly, options option 584 can provide a user with the ability to configure one or more miscellaneous settings, including but not limited to recording options, storing options (both locally and at a server), as well as other options. Contacts option 586 can include various options related to callers and callees of the communications device 106. The send to server option 588 is an execution option for sending a recorded communication to a server. The record option 589 is an execution option for beginning and ending recording of a communication.

Also included in the exemplary embodiment of FIG. 5 is a video, files and images window 590, that can be configured to display video, files, and images associated with a communication. During a communication, various data may be sent to a user in addition to the voice communication. Such data can include video, files, and images, as well as other data. VoIP recording logic that is associated with VoIP recording interface 580 can receive this data. VoIP recording interface 580 can then display the data.

Similarly, VoIP recording interface 580 includes a statistics window 592, which can include various data related to the current communication. As shown, statistics that can be displayed include duration of the communication, file space of the recording, percentage of data that has been sent to a server, destination of the recording, file name of the recording, and file path of the recording. Other information can also be displayed.

Figure 6:
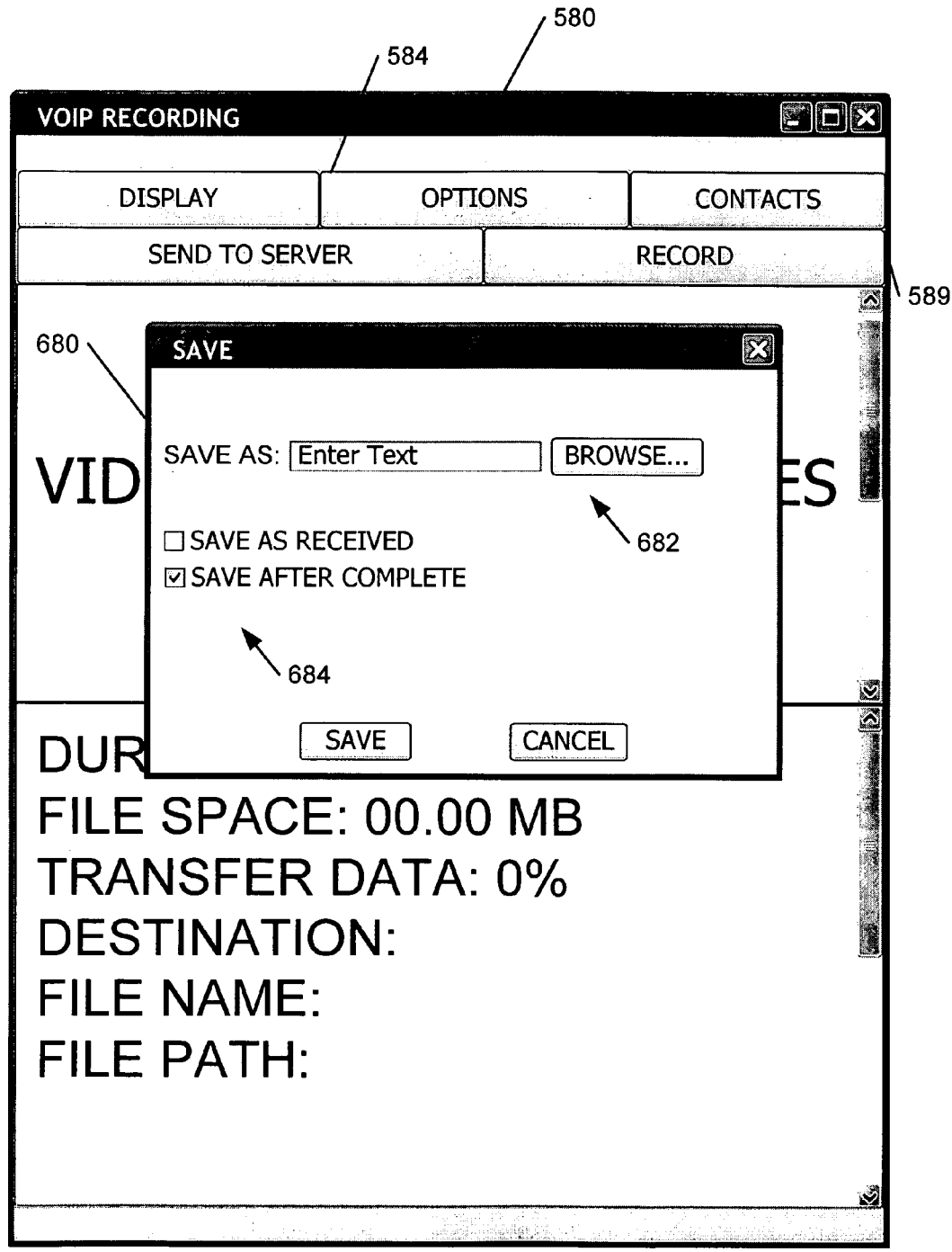
FIG. 6 is an exemplary user interface, illustrating a save function that may be accessed via the display of FIG. 5.

FIG. 6 is an exemplary user interface, illustrating a save function that may be accessed via the display of FIG. 5. More specifically, in an exemplary example, the save window 680 can be accessed via selecting the record option 589. By selecting the record option 589 (before or after the communication has been recorded), save window 680 can be presented to the user. In other embodiments, the save window 680 can be displayed in connection with the options option 584. Such configurations can indicate the default settings for all recordings, such that a user can access the save window 680 only when he or she desires. In such a configuration, default file names and file paths can be automatically selected by the VoIP recording logic (which can be included in the communications software 499, 599, or both).

Included in the save window 680 is a save as option 682. The save as option 682 can include a text box for entering the desired file name or file path for the recording. A "browse . . . " option can also be provided for allowing the user easier access to the desired file path. Also included is one or more check box options 684 to determine the desired technique for storing the created recording. More specifically, in this exemplary embodiment, the user can select the option to save the recording as received or to save the recording after complete. The save as received option indicates that the recording can be stored (locally, to a server, or both) as the recording is being created. This configuration can indiscriminately store the recording without regard to current network usage. The save after complete option can be configured to store the recording at a time when the VoIP logic determines that sufficient network bandwidth is available. This option can conserve network resources such that more time sensitive operations can be completed when network resources are scarce. A save and cancel options are also provided.

One should also note that, depending on the particular configuration, communications may be recorded based on the desires of the system administrator, the user, or other entity. Similarly various options related to the recording, storing, uploading, downloading, etc. of a communication may be provided to the system administrator, user, or other entity.

Figure 7:
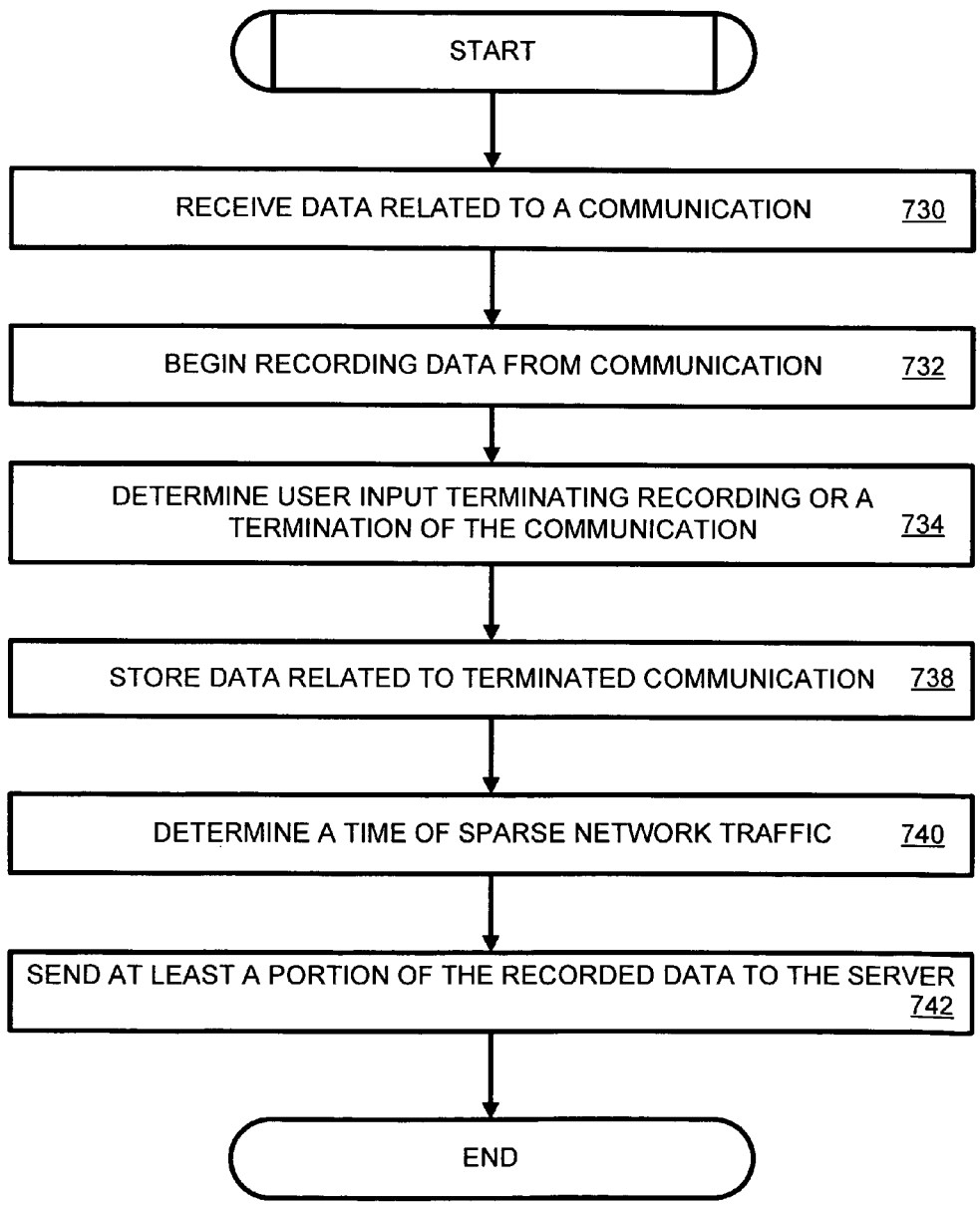
FIG. 7 is a flowchart illustrating exemplary steps that can be taken in recording a communication in a communications network, such as the networks of FIGS. 1, 2, and 3.

FIG. 7 is a flowchart illustrating exemplary steps that can be taken in recording a communication in a communications network, such as the networks of FIGS. 1, 2, and 3. The first step in this nonlimiting example is to receive data related to a communication (block 730). The VoIP logic (which can be included in the communications software 499, 599 or both) can be configured to receive data associated with a communication, which can take the form of a user input associated with placing a call or data related to an incoming communications request. Once this data is received, the VoIP logic can begin recording data from the communication (block 732). The data from the communication can include voice data, as well as video and other types of data. More specifically, if the communication is a video conference, or similar communication, video data may be received in addition the received audio. The VoIP logic can then continue recording the communication until a user input is received or the VoIP logic determines that the communication has terminated (block 734). Once the recording is complete, the VoIP logic can be configured to store the recorded data locally (block 738). The VoIP logic can then determine a time of sparse network traffic (block 740) and send at least a portion of the recorded data to the server (block 742).

One should note that in the nonlimiting example of FIG. 7, the recorded data can be sent to a server (or related data storage) upon a determination that network traffic is sparse. In such a configuration, the entire recorded file need not be sent at one time. In at least one configuration, portions of the recorded data can be sent to the server as network resources are available. This determination can be based on a predetermined threshold of network activity, a predicted determination of network activity, or other determination.

Figure 8:
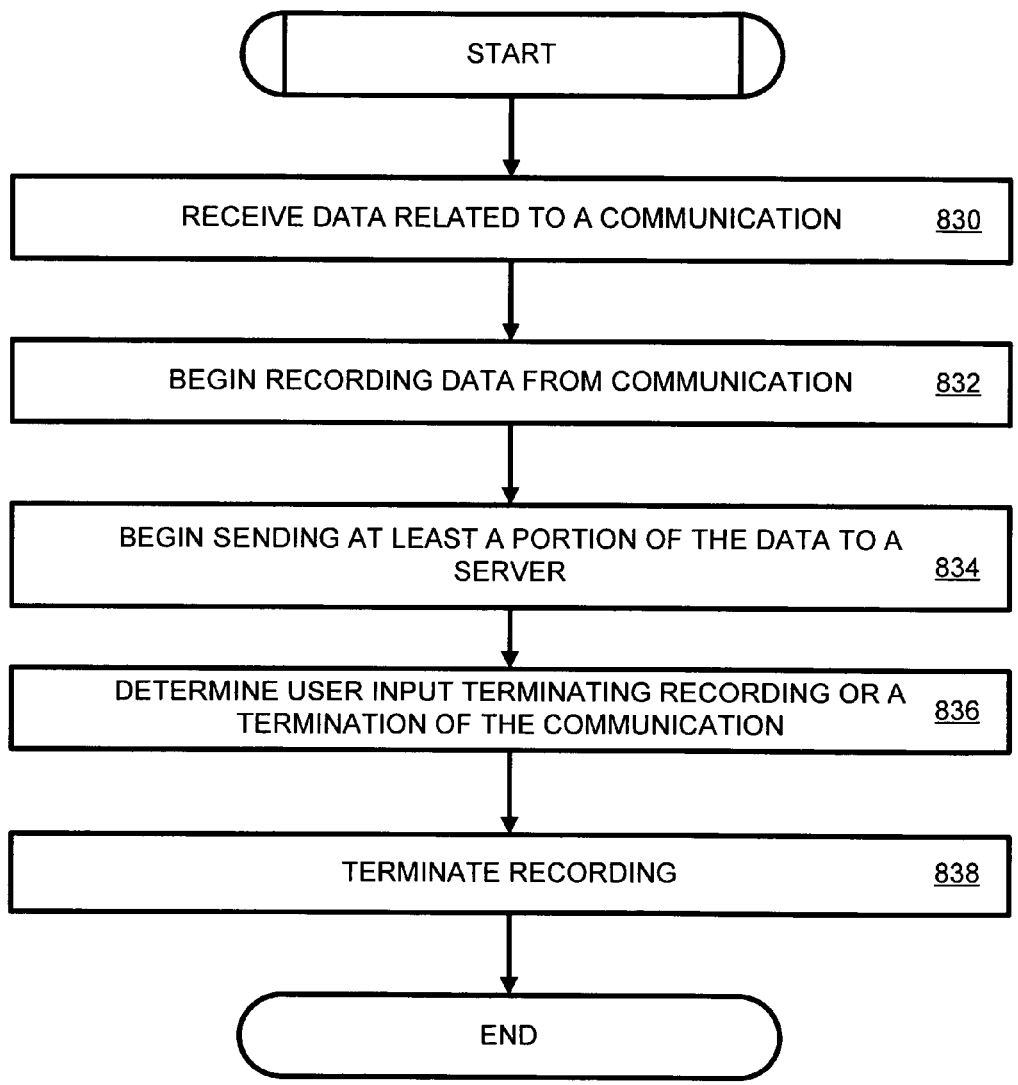
FIG. 8 is a flowchart illustrating exemplary steps that can be taken in recording a communication and concurrently sending the data to a server.

FIG. 8 is a flowchart illustrating exemplary steps that can be taken in recording a communication and concurrently sending the data to a server, similar to the flowchart from FIG. 7. The first step in the nonlimiting example of FIG. 8 is to receive data related to a communication (block 830). Similar to the first step in FIG. 7, this step can include receiving data related to an outgoing communication or data related to an incoming communication. Once this data is received, the VoIP logic can begin recording data from the communication (block 832). Upon commencement of recording, the VoIP logic can begin sending at least a portion of the recorded data to a server (block 834). The VoIP logic can then determine that a user input indicates a termination of recording or the VoIP logic can determine that the communication has terminated (block 836). The VoIP logic can then terminate the recording.

As the flowchart from FIG. 7 illustrates an embodiment where a recording is sent to a server when network activity is low, the nonlimiting example of FIG. 8 illustrates an embodiment where the recording is sent to the server as the recording is taking place. This embodiment may be desirable when local storage of the recorded data is desired due to current network traffic. As discussed above, an option can be provided to a user to determine whether the recording is immediately stored at a server or whether the recording is queued for subsequent delivery.

Additionally, other exemplary embodiments can provide for the precise relative time-stamping of audio and screen content (e.g., speech recognition can take cues from the screen activity immediately following the audio). More specifically, if the user selects "John Doe" from the list and the speech recognizers interprets voice input as either "John Doe" or "Don't know" because of the more likely scenario, the speech recognizers can infer that the former is more likely and hence gain higher accuracy.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A system for distributed recording of a communication, the system comprising:
a central recording system configured to receive and store data related to the communication, wherein the central recording system is coupled to a communications network;
a computing device configured to record data related to the communication, buffer at least a portion of the data related to the communication for subsequent delivery to the central recording system at a time of network traffic below a predetermined threshold of network traffic and send at least a portion of data related to the communication to the central recording system, the computing device comprising a screen capture daemon configured to facilitate capture of visual data related to the communication, a capture control daemon configured to assemble data into audio streams, and a voice capture daemon configured to facilitate capture of audio data related to the communication, wherein the computing device is connected to a local network and the local network is connected to the communications network;
a capture controlling device, the capture controlling device separate from the computing device and coupled to the communications network, the capture controlling device configured to provide at least one packet assembly command to the capture control daemon;
an application server, the application server coupled to the communications network, the application server configured to send at least one action command to the capture controlling device;
a local routing component coupled to the computing device via the local network, the local routing component configured to receive and store data related to the communication if the connection between the local network and the communications network is severed; and
a communications device, the communications device coupled to the computing device, the communications device configured to facilitate communication between a first user and a second user and operable to provide data for recording by the computing device,
wherein the local routing component is further configured to facilitate communication between a first user and a second user and operate to provide data for recording by the computing device if the connection between the local network and the communications network is severed, and
wherein the local routing component is further configured to use Survivable Remote Site Telephony to facilitate communication between a first user and a second user and operate to provide data for recording by the computing device if the connection between the local network and the communications network is severed.

2. The system of claim 1, wherein the system is configured for recording the communication absent a connection between the computing device and at least one of the following: the capture controlling device, the central recording device, and the application server.

3. The system of claim 1, wherein the computing device is configured to encrypt at least a portion of data related to the communication.

4. The system of claim 1, wherein the computing device is configured to compress at least a portion of data related to the communication.

5. The system of claim 1, wherein the communications device is a Voice over Internet Protocol (VoIP) telephone.

6. The system of claim 1, wherein the computing device is further configured to send data to the central recording system as the communication is recorded.

7. The system of claim 1, wherein the application server is further configured to receive at least one screen frame from the screen capture daemon.

8. The system of claim 1, wherein the voice capture daemon is configured to start and stop capture of Real Time Protocol (RTP) packets.

9. The system of claim 1, wherein the capture control daemon is configured to assemble at least one Real Time Protocol (RTP) packet into at least one audio stream.

10. The system of claim 1, wherein the local routing component is further configured to receive and store data related to the communication in response to the connection between the local network and the communications network being severed.

11. A method for distributed recording of a communication, the method comprising:

receiving the communication;

providing a communications device that is coupled to a computing device, the communications device configured to facilitate communication between a first user and a second user and operable to provide data for recording by the computing device;

recording, at the computing device, at least a portion of data related to the communication at a computing device, wherein the computing device includes a screen capture daemon configured to facilitate capture of visual data related to the communication, a capture control daemon configured to assemble data into audio streams, and a voice capture daemon configured to facilitate capture of audio data related to the communication, wherein the computing device is connected to a local network and the local network is connected to a communications network;

buffering at least a portion of the data related to the communication for subsequent delivery to a central recording system at a time of network traffic below a predetermined threshold of network traffic;

sending at least a portion of data related to the communication to the central recording system, wherein the central recording system is coupled to the communications network;

providing at least one packet assembly command to the capture control daemon from a capture controlling device, wherein the capture controlling device is implemented separately from the computing device and coupled to the communication network;

sending at least one action command to a capture controlling device from an application server; and sending at least a portion of data related to the communication to a local routing component if the connection between the local network and the communication network is severed, wherein the local routing component is further configured to facilitate communication between a first user and a second user and operate to provide data for recording by the computing device if the connection between the local network and the communications network is severed, and wherein the local routing component is further configured to use Survivable Remote Site Telephony to facilitate communication between a first user and a second user and operate to provide data for recording by the computing device if the connection between the local network and the communications network is severed.

12. The method of claim 11, wherein recording at least a portion of data related to the communication at a computing device includes recording at least a portion of data related to the communication absent a connection between the computing device and at least one of the following: the capture controlling device and the central recording device.

13. The method of claim 11, further comprising encrypting at least a portion of data related to the communication.

14. The method of claim 11, further comprising compressing at least a portion of data related to the communication.

15. The method of claim 11, further comprising sending data to the central recording system as the communication is recorded.

* * * * *